United States Patent [19]

Shimizu et al.

[11] Patent Number: 4,989,204
[45] Date of Patent: Jan. 29, 1991

[54] HIGH THROUGHPUT COMMUNICATION METHOD AND SYSTEM FOR A DIGITAL MOBILE STATION WHEN CROSSING A ZONE BOUNDARY DURING A SESSION

[75] Inventors: Toshimitsu Shimizu; Yasuhiko Sako, both of Tokyo, Japan

[73] Assignee: NEC Corporation, Tokyo, Japan

[21] Appl. No.: 308,276

[22] Filed: Feb. 9, 1989

[30] Foreign Application Priority Data

Feb. 10, 1988 [JP] Japan ................................. 63-29066
Feb. 10, 1988 [JP] Japan ................................. 63-29067
Feb. 10, 1988 [JP] Japan ................................. 63-29068
Jan. 26, 1989 [JP] Japan ................................. 1-19037

[51] Int. Cl.$^5$ ........................ H04J 3/00; H04L 12/56
[52] U.S. Cl. .................................. 370/94.1; 370/60; 455/33
[58] Field of Search ..................... 455/33; 379/58, 59, 379/16; 370/94, 60, 95

[56] References Cited

U.S. PATENT DOCUMENTS

| | | | |
|---|---|---|---|
| 4,718,081 | 5/1988 | Brenig | 379/60 |
| 4,807,224 | 2/1989 | Naron et al. | 370/94 |
| 4,829,554 | 5/1989 | Barnes et al. | 379/58 |
| 4,864,564 | 9/1989 | Parker et al. | 370/94.1 |
| 4,864,576 | 9/1989 | Mark | 370/94.1 |

Primary Examiner—Douglas W. Olms
Assistant Examiner—Christopher O. Edwards
Attorney, Agent, or Firm—Sughrue, Mion, Zinn, Macpeak & Seas

[57] ABSTRACT

In a digital radio communications system, a mobile station in the service zone of a first base station transmits a reconnect request packet to a second base station when leaving the service zone of the first and entering the service zone of the second during a session with the first base station. The second base station communicates the receipt of the reconnect request packet to the central station, from which a proceed-to-clear command packet is sent to the first base station to allow it clear the connection with the mobile station and return a clear response packet to the central station informing it of a serial number of the last data packet it has received from the mobile station immediately before leaving its service zone. On receiving the clear response packet, the central station sends a reconnect command packet indicating that serial number to the second base station to cause it to issue a reconnect response packet to the mobile station requesting the reconnect. The reconnect response packet communicates the serial number of the last packet to the mobile station to allow it to send a copy of data packets which may have been interrupted during the session with the first base station.

12 Claims, 8 Drawing Sheets

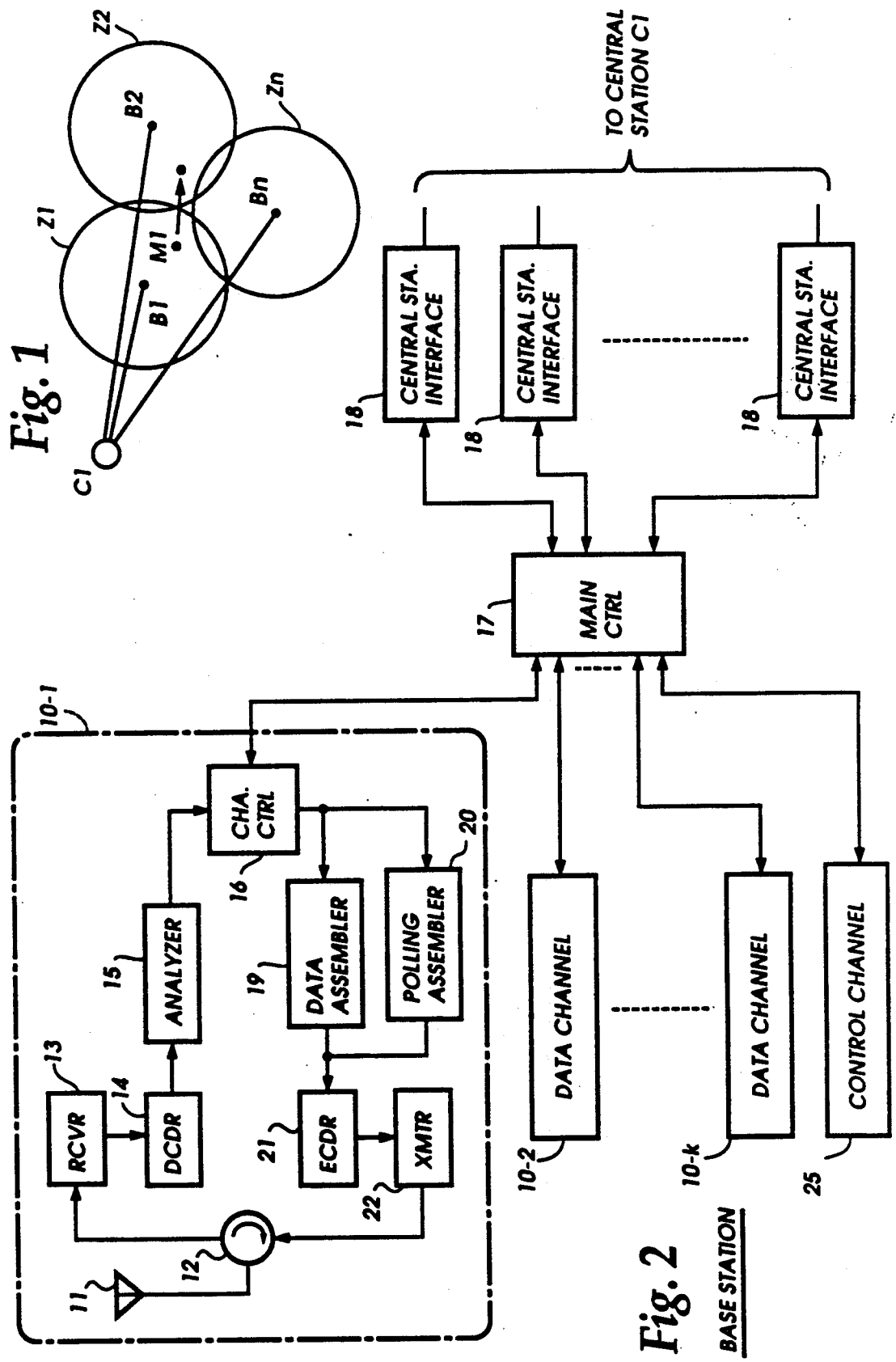

Fig. 5b

ACK/NAK FROM MS TO BS

| SYNC | TYP | CTRL | S#n | ODD/EVEN | FCS |

70

RECONNET REQUEST FROM MS TO BS

| SYNC | TYP | CTRL | SOURCE MS ID | DSTN ZN ID | PRV ZN ID | PRV CH#n | PRV S#n | BLK#n | FCS |

71

PROCEED-TO-CLEAR COMMAND FROM CS TO BS

| SYNC | TYP | CTRL | PRV S#n | SOURCE MS ID | DSTN MS ID | FCS |

72

CLEAR RESPONSE FROM BS TO CS

| SYNC | TYP | CTRL | PRV S#n | SOURCE MS ID | DSTN MS ID | FCS |

73

RECONNECT COMMAND FROM CS TO BS

| SYNC | TYP | CTRL | SOURCE MS ID | DSTN MS ID | FCS |

74

RECONNECT RESPONSE FROM BS TO MS

| SYNC | TYP | CTRL | S#n | SOURCE MS ID | DSTN MS ID | FCS |

POLLING PACKET FROM BS TO MS

| SYNC | CTRL | S#n | D#n | T/R | FCS |
|------|------|-----|-----|-----|-----|

60

SERVICE REQUEST FROM MS TO BS

| SYNC | TYP | CTRL | SOURCE MS ID | DSTN MS ID | FCS |
|------|-----|------|--------------|------------|-----|

61

DATA PACKET BETWEEN MS AND BS

| SYNC | TYP | CTRL | LGTH | S#n | D#n | DATA | FCS |
|------|-----|------|------|-----|-----|------|-----|

62

DATA PACKET BETWEEN BS AND CS

| SYNC | TYP | CTRL | S#n | BLK#n | DATA | FCS |
|------|-----|------|-----|-------|------|-----|

63

RECONNECT REQUEST FROM MS TO BS

| SYNC | TYP | CTRL | SOURCE MS ID | DSTN ZN ID | PRV ZN ID | PRV CH#n | PRV S#n | FCS |
|------|-----|------|--------------|------------|-----------|----------|---------|-----|

64

PROCEED-TO-CLEAR COMMAND FROM CS TO BS

| SYNC | TYP | CTRL | PRV S#n | SOURCE MS ID | DSTN MS ID | FCS |
|------|-----|------|---------|--------------|------------|-----|

65

CLEAR RESPONSE FROM BS TO CS

| SYNC | TYP | CTRL | PRV S#n | SOURCE MS ID | DSTN MS ID | BLK#n | FCS |
|------|-----|------|---------|--------------|------------|-------|-----|

66

RECONNECT COMMAND FROM CS TO BS

| SYNC | TYP | CTRL | SOURCE MS ID | DSTN MS ID | BLK#n | FCS |
|------|-----|------|--------------|------------|-------|-----|

67

RECONNECT RESPONSE FROM BS TO MS

| SYNC | TYP | CTRL | S#n | SOURCE MS ID | DSTN MS ID | BLK#n | FCS |
|------|-----|------|-----|--------------|------------|-------|-----|

68

HIGH THROUGHPUT COMMUNICATION METHOD AND SYSTEM FOR A DIGITAL MOBILE STATION WHEN CROSSING A ZONE BOUNDARY DURING A SESSION

BACKGROUND OF THE INVENTION

The present invention relates generally to digital radio communications system, and specifically to a packet radio communications system having mobile packet terminals which may move randomly across boundaries between service zones of adjacent base stations.

Generally, packet radio communications system has a central station that administers a plurality of base stations each covering a respective service zone. During a transmit mode, a mobile station in a given service zone transmits an up-direction packet in response to a polling packet from the base station of the given zone. When the up-direction packets of a predetermined number have been received by the base station, it assembles them into a data block and sends it to the central station. During a receive mode of the mobile station, down-direction data packets are transmitted from the central station as a single data block to the base station where it is disassembled into individual packets and transmitted in sequence to the mobile station. When the mobile station moves across a zone boundary, leaving the service zone of a first base station and entering the zone of a second, adjacent base station during a communication with the first base station, the latter attempts to continue the communication until a timeout period is lapsed. If the mobile station attempts to establish a connection with the second base station within the timeout period, the second base station rejects it as an unauthorized attempt. When the timeout period has lapsed, the mobile station realizes that it is unable to continue communicating with the first base station and attempts to establish a new communication with the second base station. Even if this attempt is successful, the mobile station must retransmit to it a copy of the whole contents of data which have been transmitted to the first base station since the lapse of the timeout period is regarded as an abandonment of a communication. As a result, the current digital radio communications system experiences a low throughput when a mobile station crosses a zone boundary in the midst of a session.

SUMMARY OF THE INVENTION

It is therefore an object of the present invention to provide a packet radio communications system which ensures high throughput communication when mobile station moves across a boundary between adjacent service zones.

According to a broader aspect of the present invention, the digital radio communications system comprises a central station and a plurality of base stations connected thereto. A mobile station roaming in the service zone of a first base station transmits a reconnect request packet to an adjacent, second base station when leaving that service zone and entering the service zone of a second, adjacent base station during a session with the first base station. The second base station communicates the receipt of the reconnect request packet to the central station. A proceed-to-clear command packet is sent from the central station to the first base station in response to the communication from the second base station. The first base station clears the first connection with the mobile station in response to the proceed-to-clear command packet and returns a clear response packet to the central station informing it of a serial number of the last data packet it has received from the mobile station immediately before leaving its service zone. On receiving the clear response packet, the central station sends a reconnect command packet indicating that serial number to the second base station to cause it to issue a reconnect response packet to the mobile station requesting the reconnection. The reconnect response packet also indicates the serial number of the last packet. A copy of data packets which are specified by the reconnect response packet is transmitted from the second base station to the mobile station to allow it to resume transmission starting with the first data packet of the specified data block.

Preferably, each of the data packets sent from the mobile station indicates a serial number thereof to permit each of the base stations to detect discontinuity in the serial numbers which occurs as a result of a lost of a data packet during transmission. The mobil station further transmits a block serial number identifying a block of data packets. If a serial number of a given packet is lost and the base station recognizes it as the occurrence of a discontinuity, a packet requesting retransmission is sent therefrom to the mobile station, which responds to it by retransmitting a copy of a data block containing the given packet.

According to a second aspect of the present invention, each of the base stations is capable of transmitting a block of down-direction data packets received from the central station to the mobile station and the mobile station is capable of receiving the block of down-direction data packets from a base station. The mobile station transmits a second reconnect request packet to the second base station when moving across the boundary between the service zones of the first and second base station while receiving packets from the first base station. The second reconnect request packet indicates a serial number of a last data block which was received by the mobile station from the first base station immediately before it leaves the service zone of the first base station. On receiving the second reconnect request, the second base station communicates the receipt of this second reconnect request packet to the central station, which transmits a second proceed-to-clear command packet to the first base station to allow it to clear the first connection. On clearing the first connection, the first base station transmits a clear response packet to the central station. The central station transmits a second reconnect command packet to the second base station. The second base station responds to the second reconnect command packet by establishing a connection with the mobile station. The central station begins transmitting a block of down-direction data packets to the second base station which is specified by the serial number contained in the second reconnect request packet communicated from the second base station, the data blocks transmitted to the second base station being relayed through the established connection to the mobile station to resume the receive mode of operation.

Preferably, each of the base stations is capable of transmitting to the mobile station a packet indicating that the base station has the right to transmit before transmitting the block of down-direction data packets to the mobile station and another packet following the transmission of the block of down-direction data packets requesting the mobile station to acknowledge receipt of the block of down-direction data packets. The mobile station transmits an acknowledgment packet indicating receipt of the block of down-direction data packets in response to the acknowledgement requesting packet. To avoid a situation that occurs when a whole data block is correctly received but lost due to misinterpretation by the mobile station on a possible loss of a right-to-transmit indicating packet, the acknowledgment packet has an indication which alternates between odd and even numbers when successive ones of the right-to-transmit indicating packets are correctly received by the mobile station and repeats a previous indication when the right-to-transmit indicating packet is not detected by the mobile station. Each of the base stations retransmits a copy of a previously transmitted block of down-direction data packets when the acknowledgment packet repeats the previous indication.

BRIEF DESCRIPTION OF THE DRAWINGS

The present invention will be described in further detail with reference to the accompanying drawings, in which:

FIG. 1 is a schematic diagram of a packet radio communications system of the present invention;

FIG. 2 is a block diagram of each of the base stations of FIG. 1;

FIG. 5a is an illustration of various packets employed during transmit and receive modes of a mobile station and FIG. 5b is an illustration of packets used during a receive mode of the mobile station;

DETAILED DESCRIPTION

Figure 3:
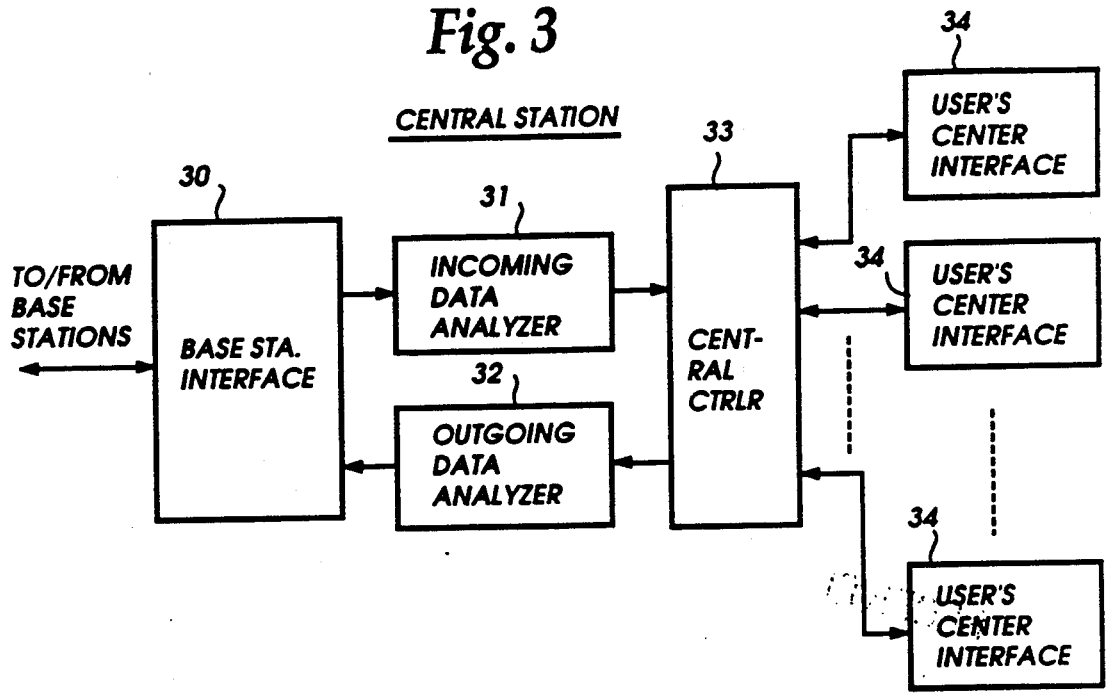
FIG. 3 is a block diagram of the central station of FIG. 1.

Referring now to FIG. 1, there is shown a packet radio communication system for providing services to mobile packet radio terminals according to an embodiment of the present invention. The system comprises a plurality of base stations $B_1$ through $B_n$ covering respective service zones $Z_1$, $Z_2$ and $Z_n$. These base stations are connected to a central station $C_1$ which controls the exchanging of packet data between the base stations. Mobile packet terminals (mobile stations) receive uninterrupted packet communication services from nearby base stations even though they are moving from one service zone to another. In FIG. 1, only one mobile packet terminal $M_1$ is illustrated for the purpose of disclosure.

As shown in FIG. 2, each base station comprises a plurality of data channels 10-1 through 10-k of identical configuration to establish two-way radio channels for exchanging data with the mobile stations located within the respective service zone and a control channel 25 for establishing and clearing a connection. Each of the data channels 10 includes an antenna 11 to receive signals from a mobile station, and a duplexer 12 through which received signals are passed to a receiver 13 to recover baseband signals. The baseband signals are decoded by a decoder 14 into original packets according to a prescribed line code format which is employed in the communication system. A data analyzer 15 is coupled to the decoder 14 to examine the overhead of a received packet to determine its contents and supplies an output signal indicating the result of the determination to a channel controller 16. In accordance with the output of analyzer 15, channel controller 16 passes the received message data to the central station $C_1$ through a main controller 17 and an associated central station interface unit 18, and provides polling and retransmission control on the mobile stations. In a manner as will be described, channel controller 16 is provided with additional features including (a) receiving a "reconnect" request from a mobile station entering the service zone of the own base station during a communication with an adjacent base station, (b) receiving a "proceed-to-clear" command signal from the central station to clear a connection which has been established between a leaving mobile station and the own base station and return a "clear" response signal indicating the serial number of a data block which has been interrupted, and (c) establishing a "reconnect" to the entering mobile station in response to a "reconnect" command signal from the central station. These command signals are sent from the central station and received by the channel controller 16 through the associated central station interface 18 and passed to a data assembly circuit 19 and a polling assembly circuit 20 to respectively generate data and polling sections of a packet according to a prescribed data structure as will be described later. An encoder 21 is connected to encode the outputs of the data and polling assembly circuits 19, 20 according to the prescribed line code format and applies the coded signal to a transmitter 22 where it is digitally modulated upon a carrier and fed to the duplexer 12 for transmission to mobile stations. Control channel 25 is a transmitter which is identical to the transmit section of each data channel 10.

Prior to the establishment of a connection, control channel 25 of a base station transmits a pilot signal that indicates idle data channels. Each mobile station monitors this pilot signal to select an idle channel to set up a connection with the base station. A service request packet is then transmitted from the mobile station, received by the selected data channel and passed to the main controller 17. Main controller 17 keeps a record of session numbers established by each data channel and constantly updates the record as a session ends or when it assigns an idle session number to a requesting mobile station. When an idle session number is assigned to a requesting station, a response packet is transmitted to the requesting mobile station through the selected data channel to notify the assigned session number. Mobile station stores the assigned session number and writes it into an up-direction data packet it sends to a base station to allow it to identify its session. Main controller 17 further couples each session established in each of the data channels 10-1 through 10-k to one of the central station interface units 18.

Channel controller 16 of each data channel includes a data memory for storing data packets received from a mobile stations and a counter that counts the number of up-direction data packets stored in that memory. When the number of data packets stored in that data memory reaches n, the channel controller 16 assembles the received data packets into a block and sends it through the main controller 17 to the central station $C_1$.

In FIG. 3, the central station $C_1$ is made up of a base-station interface unit 30 which interfaces between an associated central station interface unit 18 on the one hand and an incoming (up-direction) data analyzer 31 and an outgoing (down-direction) data analyzer 32 on the other. Incoming data analyzer 31 examines the contents of a data block received from each base station and feeds a central controller 33, which selectively establishes a connection to one of a plurality of user's center interface units 34 and sends received block data to the selected user's center interface unit 34 and passes signals received from the selected interface unit 34 to the outgoing data analyzer 32. Additional functions of the central controller 33 include (a) receiving a "reconnect" request from a new base station when a mobile station is entering its service zone while a session is in progress, (b) transmitting a "proceed-to-clear" command signal to the previous base station to cause it to return a preceding data block which has been received from the mobile station before it las left the previous zone, and (c) receiving that preceding data block and relaying it to the new base station to cause it to establish a "reconnect" to the entering mobile station to permit it to send data packets starting with the beginning of the interrupted data block. Such command signals are applied through outgoing data analyzer 32 to the base station interface unit 30 and thence to the associated base station.

Figure 4:
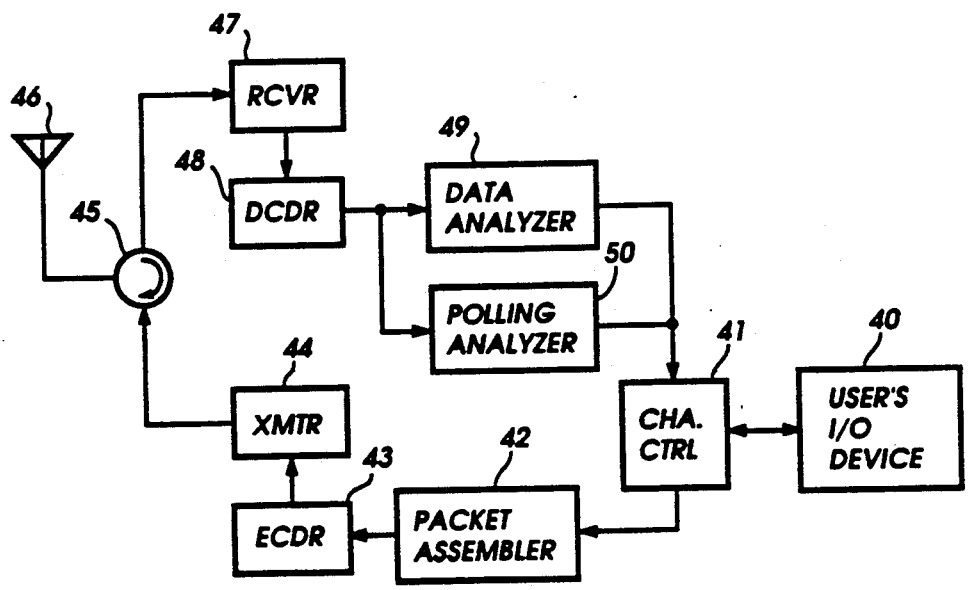
FIG. 4 is a block diagram of the mobile station of FIG. 1.

As shown in FIG. 4, the mobile station $M_1$ comprises a user's input/output (I/O) device 40 connected to a channel controller 41. During a transmission mode, mobile station $M_1$ responds to a polling packet from a base station by applying signals from the I/O device 40 to a packet assembly circuit 42 where the signals are assembled into an up-direction packet and applied to an encoder 43 where it is converted to a form suitable for transmission according to the line code of the system. The coded signal is modulated upon a carrier by a transmitter 44 and supplied through a duplexer 45 to an antenna 46. During a reception mode, a sequence of down-direction packets is received, which is preceded by a polling packet that indicates that the base station has the right to transmit. The packet sequence is followed by another polling packet which requests the mobile station to send an acknowledgment packet. Signals from the base station are received by antenna 46, coupled through duplexer 45 to a receiver 47 where they are demodulated into a baseband signal and fed to a decoder 48 where it is converted to the original packet according to the line code of the system and fed to a data analyzer 49 and a polling analyzer 50. The outputs of data and polling analyzers 49 and 50 are coupled to the channel controller 41 and thence to the user's I/O device 40. Channel controller 41 directs (a) the transmission of a service request packet in response to a polling packet which urges such a packet, (b) the transmission of a "reconnect" request packet when the mobile station leaves the service zone of a given base station while the session is in progress and enters an adjacent service zone, and (c) the reception of a "proceed-to-send" command packet from the new base station requesting the mobile station to restart transmitting data packets beginning with the first packet of an interrupted data block.

The operation of the system when a mobile station is in a transmit mode will now be described with reference to FIGS. 5a and 6. With a connection being established in response to a pilot signal in a manner as described above, the channel controller 16 of the selected data channel 10 sends a polling packet 60 to urge the mobile station to send a service request packet 61. As shown in FIG. 5a, polling packet 60 is preceded by a frame sync field (SYNC) that defines the frame start timing and followed by a frame check sequence field (FCS). Polling packet 60 is partitioned into a number of fields including control (CTRL), session serial number (S#n, where n=0, 1, 2, 3 ...), data serial number (D#n) and transmit/receive mode indication (T/R). The session serial number field S#n is "0" when the base station urges mobile stations to send the service request packet 61, and is subsequently changed to identify a session. The T/R field is "1" when a given mobile station has the right to transmit and "0" when the base station has the right to transmit. The data serial number field D#n of the polling packet 60 indicates the serial number of an up-direction data packet which is to be subsequently received from a mobile station. Under control of the base station main controller 17, the polling packet 60 with a session number 0 is assembled by the polling assembly circuit 20 of the selected data channel prior to the establishment of a session.

Service request packet 61 includes type (TYP) signifying the type of packet, control (CTRL), source mobile station identifier (SOURCE MS ID) and destination mobile station identifier (DSTN MS ID) fields. This service request packet is assembled by packet assembly circuit 42. Data packet 62 includes fields which are designated type (TYP), control (CTRL), length (LGTH) which indicates the variable length of the last data packet of a block, session serial number (S#n), data serial number (D#n) and data (DATA) containing a message. Data packets 62 are assembled in each base station by the data assembly circuit 19 of the selected data channel and also assembled by the packet assembly circuit 42 of the mobile station $M_1$.

When establishing a session to base station $B_1$, mobile station $M_1$ examines the S#n and T/R fields of a polling packet from base station $B_1$. If S#n is "0" and the T/R field is "1", the mobile station $M_1$ is allowed to transmit a service request packet 61, which is received by the selected data channel 10 of base station $B_1$. The identifier of a destination service zone is then notified to the mobile station $M_1$ from the base station $B_1$ through the selected data channel.

With the session being established, mobile station $M_1$ sends an up-direction data packet 62 in response to a polling packet with a session field session field identifying the established session. In the base station $B_1$, the channel controller 16 of the selected data channel 10 stores these up-direction data packets and counts their number. When the count reaches n, base station $B_1$ assembles the stored packets into a data block and sends it to the central station $C_1$ in the form shown at 63 including a block serial number (BLK#n) indicating the serial number of the data block.

Figure 6:
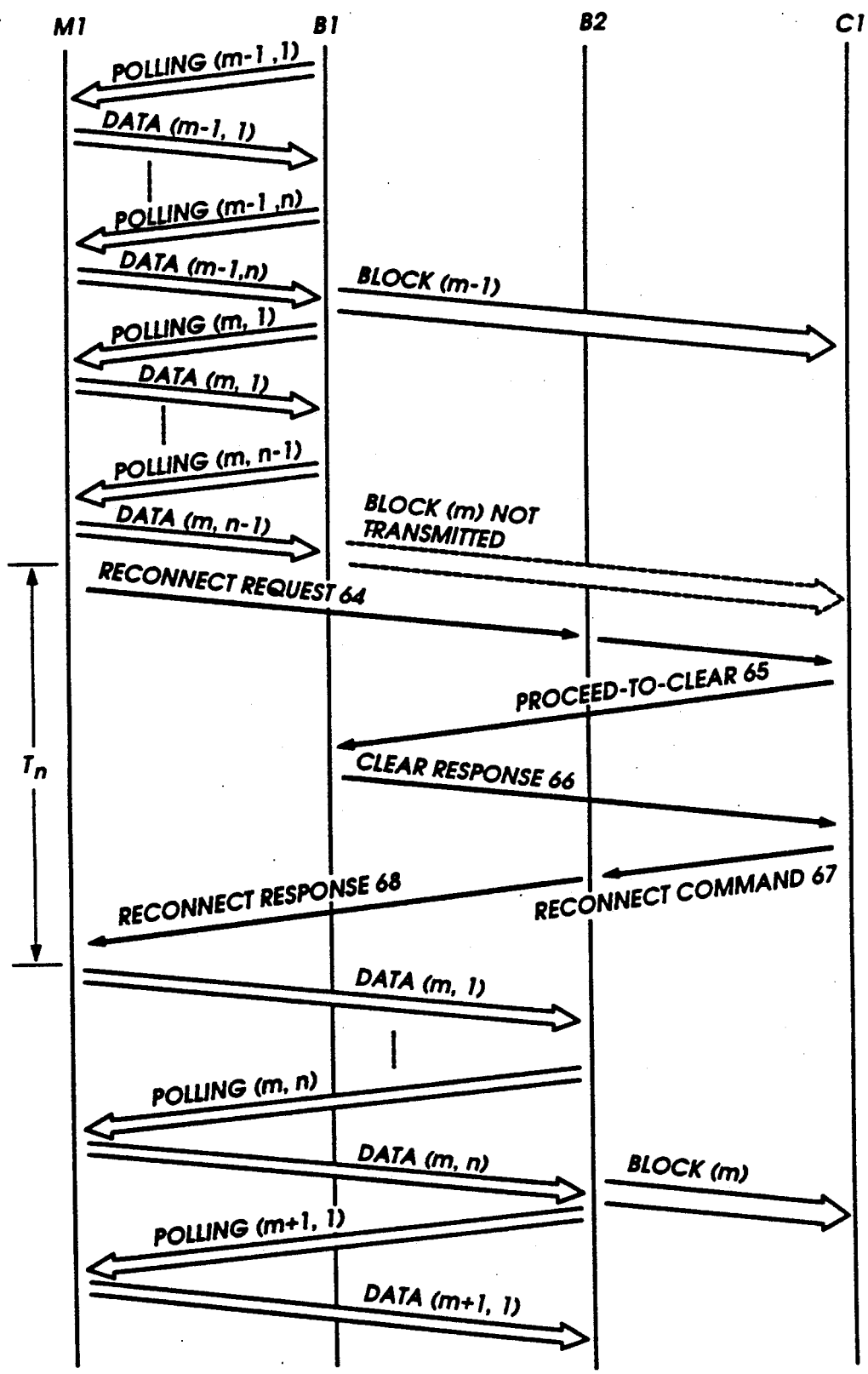
FIG. 6 is a flow diagram of the communications system according to a first embodiment of the present invention.

As shown in FIG. 6, if the session continues in this way, polling packets 60 and up-direction data packets 62 are exchanged in an alternate fashion, and n up-direction data packets 62 are received by base station $B_1$ and assembled into an (m−1)th data block and transmitted to central station $C_1$.

Assume that mobile station $M_1$ has moved in the direction of the arrow in FIG. 1 and crossed the boundary between service zones $Z_1$ and $Z_2$ at the end of the (n−1)th transmission of n up-direction data packets which will form an m-th data block in the base station $B_1$.

The crossing of a boundary may be detected by constantly monitoring RF carriers from the currently serving base station as well as from surrounding base stations and comparing the power levels of the carriers with each other. When the carrier level of the serving station becomes lower than that of a new base station, the mobil station recognizes that it is crossing the boundary. Alternatively, the technique developed by British Telecomm can be used to detect the crossing of a boundary. According to this technique, known as Total Access Channel System (TACS), data bit error rate of BCH code signals sent to the mobile station is detected and compared with a prescribed reference value. When the reference value is exceeded, the mobile station recognizes it as a crossing of a boundary.

Upon entering the service zone $Z_2$ mobile station $M_1$ selects an idle data channel of the base station $B_2$ in cooperation with its control channel 25 and sends a "reconnect" request packet 64 through the selected data channel to its main controller 17. reconnect request packet 64 differs from the service request packet 61 by the inclusion of a destination zone identifier (DSTN ZN ID), a previous zone identifier (PRV ZN ID), a previous channel number (CH#n), and a previous session number (PRV S#n). On the other hand, the channel controller 16 of the data channel 10 of base station $B_1$ in which the previous session was established begins a timeout action and clears its data memory to discard data packets (m, 1) through (m, n−1) if a timeout period $T_n$ is elapsed.

In response to the reconnect request packet from mobile station $M_1$, the main controller 17 of base station $B_2$ communicates this fact through one of the central station interface units 18 to the central station $C_1$. On receiving this communication, central station controller 33 recognizes that mobile station $M_1$ has crossed the boundary between the zones $Z_1$ and $Z_2$ and requested the establishment of a reconnection with base station $B_2$. Central station's controller 33 sends a "proceed-to-clear" command packet 65 to base station $B_1$. This command packet includes the session serial number (S#n) and source and destination mobile station identifiers (SOURCE MS ID, DSTN MS ID) which are associated with the mobile station $M_1$. Main controller 17 of base station $B_1$ responds to this proceed-to-clear packet 65 by clearing the connection which has been established to mobile station $M_1$ and returns a "clear" response packet 66 by containing in it a block serial number indicating the data block which was interrupted, and the same source and destination mobile station identifiers as contained in the proceed-to-clear packet 65. In response to the clear response packet 66, the central station $C_1$ sends a "reconnect" command packet 67 to base station $B_2$ containing the same source and destination mobile station identifiers and block serial number as those contained in the clear response packet 66.

In accordance with the reconnect command packet 67, main controller 17 of base station $B_2$ assigns a new session number in the selected data channel to the mobile station $M_1$. Base station $B_2$ transmits a reconnect response packet 68 containing the newly assigned session number and the same block serial number as those contained in the reconnect command packet 67 to mobile station $M_1$ to inform it of the new session number and urge it to send up-direction data packets starting with the beginning of packets which eventually form the m-th data block in accordance with the block serial number contained in the reconnect response packet 68, if the above procedures are completed within the timeout period $T_n$ as shown in FIG. 6. Base station $B_2$ thus receives a series of up-direction data packets (m, 1) through (m, n), and a data block (m) is assembled from the received packets and transmitted to central station $C_1$.

It is seen that whenever a mobile station has crossed a zone boundary during transmission, adjacent base stations and the central station cooperate with each other to cause the mobile station to restart transmission from the beginning of an interrupted block, thus preventing the retransmission of all data packets which have been sent to a previous base station from the beginning of a session.

Figure 7:
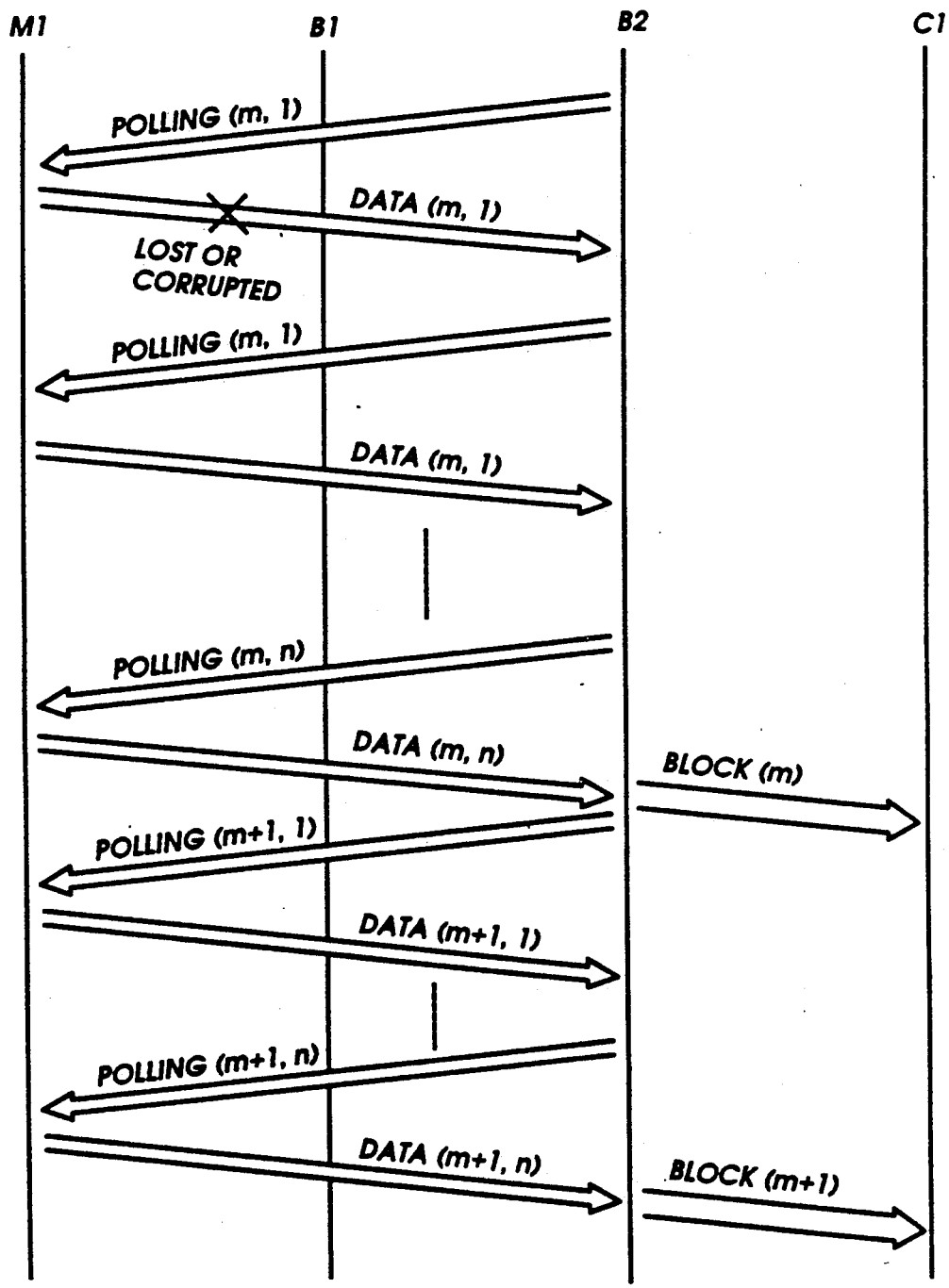
FIG. 7 is a flow diagram of the communications system when a data packet from the mobile station is lost or corrupted.

As illustrated in FIG. 7, if an up-direction data packet (m, 1) from mobile station $M_1$ is corrupted or entirely lost during transmission to base station $B_2$, for example, the latter sends the next polling packet (m, 2) by writing into its D#n field the serial number of the suspected data packet. On receiving this polling packet (m, 2), mobile station $M_1$ examines its D#n field and recognizes that packet (m, 1) was corrupted or lost and retransmits a copy of this packet.

The operation of the system during a receive mode of a mobile station will be described with reference to FIGS. 5a, 5b and 8. During the receive mode, the data number field is not used and the T/R field of the polling packet 60 is "0" to revive the right to transmit to the base station in order to transmit a block of n down-direction data packets in sequence. The T/R field changes to "1" at the end of the transmission of a data block to elicit an acknowledgment response from the mobile station. For convenience, the polling packet having a T/R=0 field is termed a "reverse" polling packet to discriminate it from the polling packet which elicits the acknowledgment response. This "reverse" polling packet 60 is initially transmitted from the base station if it has a block of data to transmit and thereafter transmitted in response to an acknowledgment response from the mobile station each time the latter has correctly received a block of n down-direction data packets from the base station.

In response to a "reverse" polling packet, the channel controller 41 of mobile station $M_1$ switches to a receive mode to accept a series of down-direction data packets 62 from base station $B_1$, while preventing packet assembler 42 from generating an up-direction data packet. On receiving a block of n down-direction data packets, data analyzer 49 checks to see if there is an error or a lost of a data packet in the received data block. If there is none, the channel controller 41 allows the packet assembler 42 to generates a positive acknowledgement (ACK) packet 70. If there is an error or lost of a packet in the received data block, the packet assembler 42 generates a negative acknowledgment (NAK) packet 70. The ACK/NAK packet 70 has a session number (S#n) and an odd/even (ODD/EVEN) field. The odd/even field alternates its indication if a "reverse" polling packet 60 is received correctly, but repeats the previous indication if the "reverse" polling packet 60 is corrupted or lost. As will be described later, the repetition of an indication in the odd/even field is to request the base base station to retransmit a copy of the suspected "reverse" polling packet and a copy of the data block that has been transmitted following the suspected packet, since the lost of a "reverse" polling packet 60 will cause the mobile station to misinterpret that it still the right to transmit and fail to supply a subsequently received data block to the user's I/O device and a positive acknowledgment would be sent to the base station if the subsequent data block is correctly received, resulting in a loss of whole data block.

Figure 8:
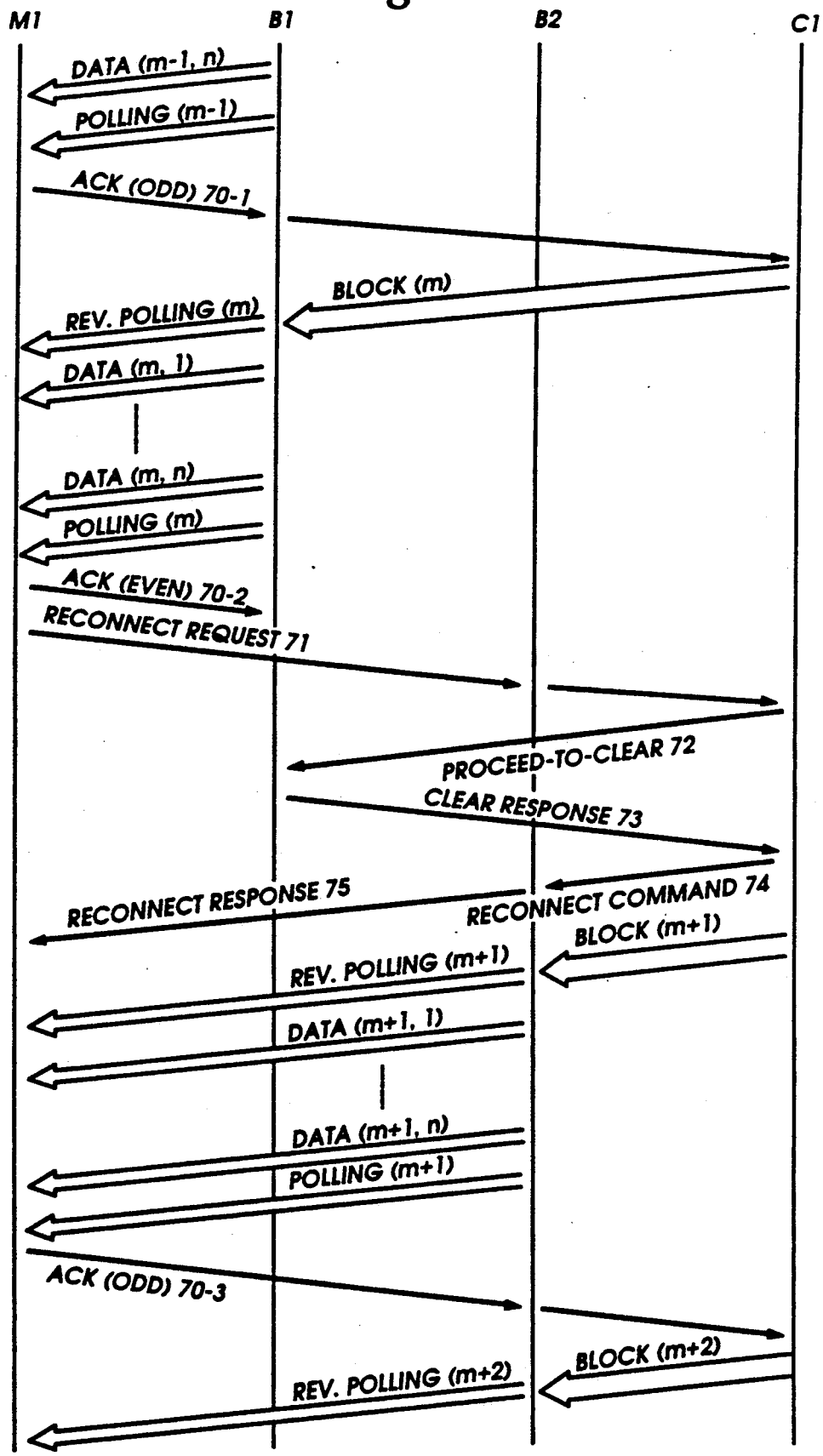
FIG. 8 is a flow diagram of the communications system according to a second embodiment of the present invention.

Thus, an $(m-1)$ polling packet 60 at the end of transmission of a data packet $(m-1, n)$ from base station $B_1$ will elicit an odd-numbered acknowledgment (ACK) packet 70-1 from mobile station $M_1$ as illustrated in FIG. 8. In response to this odd-numbered ACK packet 70-1, an m-th block of data packets is sent from central station $C_1$ to base station $B_1$ and an m-th "reverse" polling packet is sent from base station $B_1$ to mobile station $M_1$, causing it to switch to a receive mode to receive down-direction data packets $(m, 1)$ through $(m, n)$. If these packets are correctly received, an even-numbered acknowledgment packet 70-2 is transmitted from mobile station $M_1$. Assume that mobile station $M_1$ has moved in the direction of the arrow in FIG. 1 and crossed the boundary between service zones $Z_1$ and $Z_2$ at the end of reception of the even-numbered acknowledgment packet 70-2. Upon entering the service zone $Z_2$ mobile station $M_1$ selects an idle data channel in cooperation with the control channel 25 of base station $B_2$ and sends a "reconnect" request packet 71 through the selected data channel to the main controller 17 of base station $B_2$. The main controller of this base station proceeds to assign a new session number in the selected data channel in response to the reconnect request packet 71. This reconnect request packet differs from the reconnect request packet 64 mentioned earlier in that it additionally includes a block serial number (BLK#n) field in which the serial number of the last block data which was transmitted from base station $B_1$ and received by mobile station $M_1$ is indicated. In the BLK field of the reconnect request packet 71, mobile station $M_1$ writes BLK=#m. Base station $B_2$ communicates this fact to central station $C_1$, which, knowing that the last data packet of the m-th data block has been received by mobile station $M_1$, transmits a proceed-to-clear packet 72 to base station $B_1$ so that the connection between it and mobile station $M_1$ is cleared. Base station $B_1$ then returns a clear response packet 73, which is identical to proceed-to-clear command 72, to central station $C_1$. This clear response packet 73 differs from clear response packet 66 in that it lacks the block serial number field BLK#n as shown in FIG. 5b. A reconnect command packet 74 is transmitted from central station $C_1$ to base station $B_2$ to request it to establish a new connection to mobile station $M_1$ by informing it of source and destination mobile station identifiers. Base station $B_2$ then sends a reconnect response packet 75 in response to the reconnect command packet 74 to inform the mobile station $M_1$ of the newly assigned session number, and the same source and destination mobile station identifiers as contained in the reconnect command packet 74.

Since the serial number of the last data block which was received by mobile station M1 before leaving the service zone $Z_1$ has been informed by the reconnect request packet 71, central station $C_1$ now transmits an $(m+1)$-th block of down-direction data packets to base station $B_2$, which responds to it by transmitting an $(m+1)$-th "reverse" polling packet 60 to mobile station $M_1$ to switch it to a receive mode. In this way, a series of down-direction data packets $(m+1, 1)$ through $(m+1, n)$ followed by an $(m+1)$-th polling packet are transmitted to mobile station $M_1$. An odd-numbered acknowledgment packet 70-3 is returned to base station $B_2$ to permit subsequent transmission of an $(m+2)$-th "reverse" polling packet.

If no block serial number is contained in the reconnect request packet, the central station is ignorant of which data packets have been received by mobile station $M_1$ at the time of its leaving the service zone of base station $B_1$ and would repeat the transmission of the correctly received data block to base station $B_2$.

Figure 9:
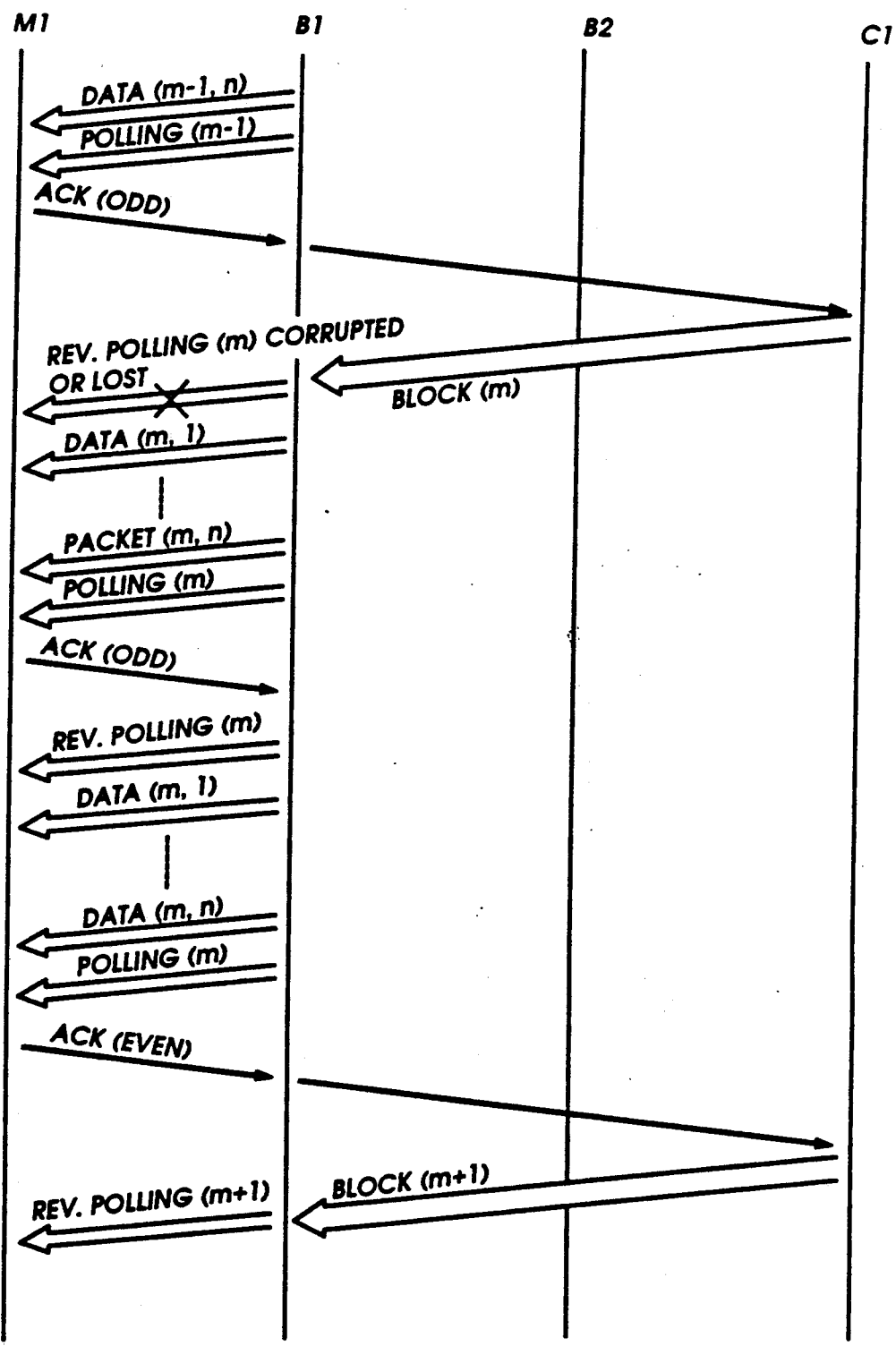
FIG. 9 is a flow diagram of the communications system when a polling packet from a base station is lost or corrupted.

If the m-th reverse polling packet from base station $B_1$ is corrupted or lost and data packets $(m, 1)$ through $(m, n)$ and an m-th polling packet are received by mobile station $M_1$ as shown in FIG. 9, the channel controller 41 of mobile station $M_1$ recognizes that the previous polling packet $(m-1)$ is still effective and fails to supply the user's I/O device 40 with down-direction data packets $(m, 1)$ through $(m, n)$ which may be received correctly following the suspected "reverse" polling packet. However, on receiving the m-th polling packet requesting acknowledgment, the channel controller 41 of mobile station $M_1$ realizes that the m-th "reverse" polling packet has been lost or corrupted and directs the packet assembler 42 to write the same indication into the odd/even field of an acknowledgment packet as that of the previous ACK packet, thus repeating the transmission of an odd-numbered acknowledgment packet ACK. The repetition of the odd-numbered ACK packets is interpreted by the main controller 17 of base station $B_1$ as the occurrence of an error event and it retransmits the m-th "reverse" polling packet to mobile station $M_1$ followed by the m-th data block. In this way, loss of data block can be avoided in the event of a loss of a "reverse" polling packet.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A digital radio communications systems comprising:
   a central station;
   a plurality of base stations connected to said central station, said base stations respectively covering service zones; and
   a mobile station capable of transmitting up-direction data packets each containing a packet serial number through a first connection to a first one of said base stations, transmitting a reconnect request packet to a second one of said base stations when moving across a boundary between the service zones of said first and second base stations during transmission and transmitting a copy of up-direction data packets specified by a reconnect response packet from said second base station, said mobile station further transmitting a block serial number identifying a block of said data packets,
   each of said base stations being capable of assembling said up-direction data packets into a data block according to said block serial number and transmitting the data block to said central station, said second base station being capable of communicating the receipt of said reconnect request packet to said central station and transmitting said reconnect response packet to said mobile station in response to a reconnect command packet from said central station, said first base station being capable of clearing said first connection in response to a proceed-to-clear command packet from said central station, and responding to said proceed-to-clear command packet by communicating to said central station the block serial number of a last data block which was sent from said mobile station to said first base station before it leaves the service zone of said first base station, said central station being capable of transmitting said proceed-to-clear command packet to said first base station in response to a communication of the receipt of said reconnect request packet from said second base station, and transmitting said reconnect command packet to said second base station indicating said block serial number communicated from said first base station.

2. A digital communications system as claimed in claim 1, wherein each of said base stations examines the block serial number of each data block and the packet serial number of each of said up-direction data packets and transmits a polling packet requesting retransmission when one of the examined packet serial numbers of a given data block is lost, said polling packet containing the block serial number of said given data block, said mobile station responding to said polling packet by examining the block serial number contained therein and retransmitting a copy of a data block identified by the examined block serial number.

3. A digital radio communications system as claimed in claim 1,
    each of said base stations being capable of transmitting a block of down-direction data packets received from said central station to said mobile station and transmitting a block serial number of said block of down-direction data packets, each of said down-direction data packets containing a packet serial number; and
    said mobile station being capable of receiving said block of down-direction data packets from each of said base stations, transmitting a second reconnect request packet to said second base station when moving across said boundary while keeping said first connection, said second reconnect request packet indicating the block serial number of a last data block received from said first base station immediately before leaving the service zone of said first base station;
    said second base station being capable of communicating the receipt of said second reconnect request packet to said central station and establishing a third connection with said mobile station in response to a second reconnect command packet from said central station, said first base station being capable of clearing said first connection in response to a second proceed-to-clear command packet from said central station;
    said central station being capable of transmitting a block of down-direction data packets, each containing a packet serial number, to said first base station if there is one to transmit and transmitting a block of down-direction data packets each containing a packet serial number, to said second base station which is specified by the block serial number contained in said second reconnect request packet communicated from said second base station, transmitting said second proceed-to-clear command packet to said first base station in response to a communication of the receipt of said second reconnect request packet, and transmitting said second reconnect command packet to said second base station.

4. A digital radio communications system as claimed in claim 3, wherein each of said base stations is capable of transmitting to said mobile station a packet indicating that the base station has the right to transmit before transmitting said block of down-direction data packets to said mobile station, and transmitting a packet to said mobile station following the transmission of said block of down-direction data packets requesting said mobile station to acknowledge receipt of said block of down-direction data packets, said mobile station being capable of transmitting an acknowledgment packet indicating receipt of said block of down-direction data packets in response to said acknowledgment requesting packet, wherein said acknowledgment packet has an indication which alternates between odd and even numbers when successive ones of the right-to-transmit indicating packets are correctly received by said mobile station and repeats a previous indication when said right-to-transmit indicating packet is not detected by said mobile station, and wherein each of said base stations retransmits a copy of a previously transmitted block of down-direction data packets when said acknowledgment packet repeats the previous indication.

5. A digital radio communications system comprising:
    a central station; and
    a plurality of base stations connected to said central station, said base stations respectively covering service zones, each of said base stations being capable of transmitting a packet to a mobile station indicating that each of said base stations has the right to transmit, transmitting a block of down-direction data packets received from said central station to said mobile station following the transmission of the right-to-transmit indicating packet, and transmitting a packet to said mobile station following the transmission of said block of down-direction data packets requesting said mobile station to acknowledge receipt of said block of of down-direction data packets;
    said mobile station being capable of transmitting a block of up-direction data packets through a first connection to a first one of said base stations, receiving said block of down-direction data packets from each of said base stations, transmitting a reconnect request packet to a second one of said base stations when moving across a boundary between the service zones of said first and second base stations while keeping said first connection, said reconnect request packet indicating a serial number of a data block received from said first base station;
    said second base station being capable of communicating the receipt of said reconnect request packet to said central station and establishing a second connection with said mobile station in response to a reconnect command packet from said central station, said first base station being capable of clearing said first connection in response to a proceed-to-clear command packet from said central station;

said central station being capable of transmitting a block of down-direction data packets to said first base station if there is one to transmit and transmitting a block of down-direction data packets to said second base station which is specified by the serial number contained in said reconnect request packet communicated from said second base station, transmitting said proceed-to-clear command packet to said first base station in response to a communication of the receipt of said reconnect request packet from said second base station, and transmitting said reconnect command packet to said second base station.

6. A digital radio communications system as claimed in claim 5, wherein mobile station transmits an acknowledgment packet to each of said base stations in response to receipt of said block of down-direction data packets, said acknowledgment packet having an indication which alternates between odd and even numbers when successive ones of said right-to-transmit indicating packets are correctly received by said mobile station and repeats a previous indication when said right-to-transmit indicating packet is not detected by said mobile station, and wherein each of said base stations retransmits a copy of a previously transmitted block of down-direction data packets when said acknowledgment packet repeats the previous indication.

7. In a digital radio communications system having a plurality of base stations respectively covering service zones for establishing a connection with a mobile station and a central station connected to said base stations, a method comprising the steps of:
   (a) establishing a first connection between said mobile station and a first one of said base station;
   (b) transmitting an up-direction data packet from said mobile station to said first base station through said first connection;
   (c) transmitting a reconnect request packet from said mobile station to a second one of said base stations when said mobile station is moving across a boundary between the service zones of said first and second base stations during transmission;
   (d) communicating the receipt of said reconnect request packet from said second base station to said central station;
   (e) transmitting a proceed-to-clear command packet from said central station to said first base station in response to said reconnect request packet from said second base station;
   (f) clearing said first connection in response to said proceed-to-clear command packet and communicating to said central station a serial number of a last block of data packets which was transmitted from said mobile station and received by said first base station immediately before said mobile station leaves the service zone of said first base station;
   (g) transmitting a reconnect command packet from said central station to said second base station specifying a block of up-direction data packets in accordance with said serial number communicated from said first base station and transmitting a reconnect response packet from said second base station to said mobile station indicating the specified block of up-direction data packets; and
   (h) transmitting a copy of the specified block of up-direction data packets from said mobile station to said second base station in accordance with said reconnect response packet.

8. A method as claimed in claim 7, wherein the step (b) comprises:
   (b1) writing in each of said up-direction data packets a serial number thereof;
   (b2) examining the serial number of each of said up-direction data packets in said first base station to detect whether or not a discontinuity exists in the examined serial numbers;
   (b3) transmitting a packet from said first base station to said mobile station requesting retransmission when said discontinuity is detected in a first given data block; and
   (b4) retransmitting a copy of said first given data block from said mobile station to said first base station in response to said retransmission requesting packet.

9. A method as claimed in claim 7, further comprising the steps of:
   (A) transmitting a block of down-direction data packets from said central station to said first base station;
   (B) transmitting to said mobile station a copy of the block of down-direction data packets received from said central station by said first base station;
   (C) receiving said block of down-direction data packets from said first base station by said mobile station;
   (D) transmitting a second reconnect request packet from said mobile station to said second base station when moving across said boundary while keeping said first connection, said second reconnect request packet indicating a serial number of a last data block received by said mobile station from said first base station immediately before leaving the service zone of said first base station;
   (E) communicating the receipt of said second reconnect request packet by said second base station to said central station;
   (F) transmitting from said central station a second proceed-to-clear command packet to said first base station in response to said second reconnect request packet from said second base station;
   (G) clearing said first connection in response to said second proceed-to-clear command packet;
   (H) transmitting a second reconnect command packet from said central station to said second base station in response to the clearing of said first connection;
   (I) establishing a connection between said mobile station and said second base station in response to a second reconnect command packet from said central station;
   (J) transmitting a block of down-direction data packets from said central station to said second base station specified by the serial number contained in said second reconnect request packet communicated from said second base station.

10. A method as claimed in claim 9, further comprising the steps of:
   prior to the step (A), transmitting a packet from each of said base stations indicating that the base station has the right to transmit;
   immediately following the step (C), transmitting a packet from each of said base stations to said mobile station requesting same to acknowledge receipt of the block of down-direction data packets received by the step (C);

transmitting an acknowledgment packet from said mobile station to each of said base stations acknowledging receipt of said block of down-direction data packets in response to said acknowledgment requesting packet, said acknowledgment packet including an indication which alternates between odd and even numbers when successive ones of the right-to-transmit indicating packets are correctly received by said mobile station and repeating a previous indication when one of the last-mentioned packet is not detected by said mobile station; and retransmitting from each of said base stations to said mobile station a copy of a previously transmitted block of down-direction data packets when said acknowledgment packet repeats the previous indication.

11. In a digital radio communications system having a plurality of base stations respectively covering service zones for establishing a connection with a mobile station and a central station connected to said base stations, a method comprising the steps of:

(a) establishing a first connection between said mobile station and a first one of said base stations;

(b) transmitting a block of down-direction data packets from said central station to said first base station;

(c) transmitting a copy of said block of down-direction data packets received from said central station by said first base station to said mobile station;

(d) transmitting a reconnect request packet from said mobile station to a second one of said base stations when moving across a boundary between the service zones of said first and second base stations while keeping said first connection, said reconnect request packet indicating a serial number of a last data block received from said first base station by said mobile station immediately before leaving the service zone of said first base station;

(e) communicating the receipt of said reconnect request packet from said second base station to said central station;

(f) transmitting a proceed-to-clear command packet from said central station to said first base station in response to said reconnect request packet from said second base station;

(g) clearing said first connection in response to said proceed-to-clear command packet;

(h) transmitting a reconnect command packet from said central station to said second base station in response to the clearing of said first connection;

(i) establishing between said second base station and said mobile station a second connection in response to said reconnect command packet;

(j) transmitting a block of down-direction data packets from said central station to said second base station specified by the serial number indicated by said reconnect request packet communicated from said second base station; and (k) transmitting a copy of said block received from said central station by said second base station to said mobile station.

12. A method as claimed in claim 11, further comprising the steps of:

prior to the step (b), transmitting a packet from each of said base stations indicating that the base station has the right to transmit;

immediately following the step (c), transmitting a packet from each of said base stations to said mobile station requesting same to acknowledge receipt of the block of down-direction data packets received by the step (c);

transmitting an acknowledgment packet from said mobile station to each of said base stations acknowledging receipt of said block of down-direction data packets in response to said acknowledgment requesting packet, said acknowledgment packet including an indication which alternates between odd and even numbers when successive ones of the right-to-transmit indicating packets are correctly received by said mobile station and repeating a previous indication when one of the last-mentioned packet is not detected by said mobile station; and retransmitting from each of said base stations to said mobile station a copy of a previously transmitted block of down-direction data packets when said acknowledgment packet repeats the previous indication.

* * * * *

UNITED STATES PATENT AND TRADEMARK OFFICE
CERTIFICATE OF CORRECTION

PATENT NO. : 4,989,204
DATED : January 29, 1991
INVENTOR(S) : Toshimitsu SHIMIZU et al It is certified that error appears in the above-identified patent and that said Letters Patent is hereby corrected as shown below:

Col. 7, line 28, delete "reconnect" and insert --Reconnect--.

Col. 10, line 6, after "packet" insert --60--.

Signed and Sealed this

Thirteenth Day of July, 1993

Attest:

MICHAEL K. KIRK

Attesting Officer

Acting Commissioner of Patents and Trademarks